(12) United States Patent
Wang et al.

(10) Patent No.: US 7,447,428 B2
(45) Date of Patent: Nov. 4, 2008

(54) METHOD AND DEVICE FOR DATA-FLOW PROTECTION OF OPTICAL INTERFACE IN DATA COMMUNICATION EQUIPMENT

(75) Inventors: Chongyang Wang, Shenzhen (CN); Zhichun Zhang, Shenzhen (CN); Shunyou Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 633 days.

(21) Appl. No.: 10/615,032

(22) Filed: Jul. 8, 2003

(65) Prior Publication Data

US 2004/0013424 A1 Jan. 22, 2004

(30) Foreign Application Priority Data

Jul. 18, 2002 (CN) ................ 02 1 26615

(51) Int. Cl.
*H04B 10/00* (2006.01)
(52) U.S. Cl. .................. 398/2; 398/5; 398/7
(58) Field of Classification Search ............ 398/2–7
See application file for complete search history.

(56) References Cited

U.S. PATENT DOCUMENTS 5,510,917 A 4/1996 Corke et al.
5,539,564 A * 7/1996 Kumozaki et al. ........... 398/2
5,594,581 A * 1/1997 Alphonsus .................. 398/6
6,392,992 B1 5/2002 Phelps et al.
6,430,335 B1 8/2002 Carberry et al.
6,947,623 B2 * 9/2005 Ramaswami et al. ........ 385/16

FOREIGN PATENT DOCUMENTS

| JP | 05-130034 | 5/1993 |
|---|---|---|
| WO | 99/18679 A | 4/1999 |
| WO | 01/05083 A1 | 1/2001 |

\* cited by examiner

*Primary Examiner*—Dalzid Singh

(57) ABSTRACT

The invention discloses a method and device for data-flow protection of an optical interface in data communication equipment. First, receiving an optical-signal from a source-neighboring device, then duplicating the received optical signal into two duplicated optical signals. One of them is sent to a protected device for processing. According to the protected device working status, either the optical signal having been processed by the protected device or the second duplicated optical signal is selected and sent to a destination-neighboring device. The device of the invention includes a first optical-signal duplicating unit and an optical-signal selecting unit. The first optical-signal duplicating unit is used for duplicating an optical signal, and the optical-signal selecting unit is used as a selector. The method and device proposed by the invention are independent to network topology and can protect data-flow reliably. The method and device can be used for applications that are sensitive for break time or is strict for routing in order to guarantee data security.

7 Claims, 3 Drawing Sheets

METHOD AND DEVICE FOR DATA-FLOW PROTECTION OF OPTICAL INTERFACE IN DATA COMMUNICATION EQUIPMENT

CROSS-REFERENCE TO RELATED APPLICATIONS

This application claims the benefit of Chinese Patent Application No. 02126615.8 filed on Jul. 18, 2002. The disclosure of the above application is incorporated herein by reference.

FIELD OF THE INVENTION

The present invention relates to data communication technology, and more particularly to a method and device for data-flow protection of an optical interface in data communication equipment.

BACKGROUND OF THE INVENTION

In network environment, data-flow is broken usually because of the failure of data communication equipment, such as router, switch and etc. The broken data-flow can be recovered usually by the multi-path effect of a network. Based on network protocols, the data sender can discover that there is a failure in intermediate communication equipment, and a new route is reselected to bypassing the failure equipment, as shown in FIG. 1.

Generally, the broken data-flow can be recovered by the multi-path effect of network; but in some specific situations, there are some drawbacks:

1. When communication equipment is at the edge of a network and there are no redundant routes, failure of intermediate communication equipment usually makes the communication equipment become an isolated information island.

2. In some special application, the source route has been defined and reselecting other route is not allowed for information security or other reasons.

3. Because failure detection of the equipment and route reselection are based on kinds of protocols, along with the best-effort nature of Internet, the duration from a failure of equipment to the data-flow recovery is unpredictable. For some applications, such as video and voice data transmission etc., are sensitive to the transmission time, and the transmission quality will be worse with this kind of data-flow recovery.

SUMMARY OF THE INVENTION

Objective of the invention is to propose a method and device for data-flow protection of an optical interface, in which the data-flow break duration is short (millisecond level) and predictable.

A method for data-flow protection of an optical interface comprising:
  receiving optical-signal from a source-neighboring device;
  duplicating the optical-signal into at least two duplicated optical-signals: a first duplicated optical-signal and a second duplicated optical-signal,
  sending the first duplicated optical-signal to the protected device for processing; and
  sending directly the second duplicated optical signal to be selected;
  receiving a working status signal output generated by the protected device and an output optical-signal from the protected device, and selecting one from the second duplicated optical-signal and the output optical-signal of the protected device, and sending the selected one to a destination-neighboring device.

In receiving a working status signal output, if the working status signal output of the protected device is normal, selecting the output optical-signal of the protected device and sending the output optical-signal to the destination-neighboring device; if the working status output of the protected device is abnormal, selecting the second duplicated optical signal directly and sending the second duplicated optical-signal to the destination-neighboring device.

Wherein between duplicating the optical signal and receivinci a working status signal output further comprising: re-duplicating the output optical-signal of the protected device into at least two re-duplicated optical-signals. The optical power of one of the two re-duplicated optical-signals is measured. When the optical power is lower than a preset threshold value, the second duplicated optical-signal is sent to the destination-neighboring device, and ending; otherwise, selecting another re-duplicated optical-signal as the output of the protected device, and executing receiving a working status signal output.

The invention proposes a data-flow protection device of an optical interface that includes a first optical-signal duplicating unit and an optical-signal selecting unit. Said first optical-signal duplicating unit receives the optical-signal sent by the source-neighboring device. The received optical-signal is duplicated into at least two optical-signals. One of the optical signals is sent to the optical-signal selecting unit directly; another is sent to the protected device and processed, then it is sent to the optical-signal selecting unit. According to the working status of the protected device, the selecting unit selects one of these two inputs and sends the duplicated optical signal to the destination-neighboring device.

The device of the invention further includes a second optical-signal duplicating unit, an optical-signal power-detecting module and a logic module. Wherein the one of the protected device output is connected to the second optical-signal duplicating unit input, one of the second optical-signal duplicating unit output connects to the optical-signal selecting unit, another output of the second optical-signal duplicating unit connects to the input of the optical power detecting module; wherein inputs of the logic module are connected to another output of the protected device and output of the optical power detecting module, respectively, and the output of the logic module connects to the control end of the optical-signal selecting unit.

Said power detecting unit includes an optical-electrical conversion diode, an operational amplifier and an analog comparator. The optical-electrical conversion diode receives the second re-duplicated optical-signal and converts to an electrical signal that is amplified by the operational amplifier, and the amplified signal is sent to the analog comparator. In the analog comparator, said amplified signal is compared with a preset threshold value, and the comparison result is used as the control signal to control the selection of the selecting unit.

Said optical-signal duplication unit is an optical splitter. Said optical-signal selecting unit is an optical switch.

The method and device proposed by the invention for data-low protection of an optical interface in data communication equipment are independent from network topology and can reliably implement data-flow protection. At the same time, the break time is short, so it is suitable for those data communication that are sensible to the break time. The method and device can satisfy the situation where routing is strictly limited in order to guarantee data security.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

The presented invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
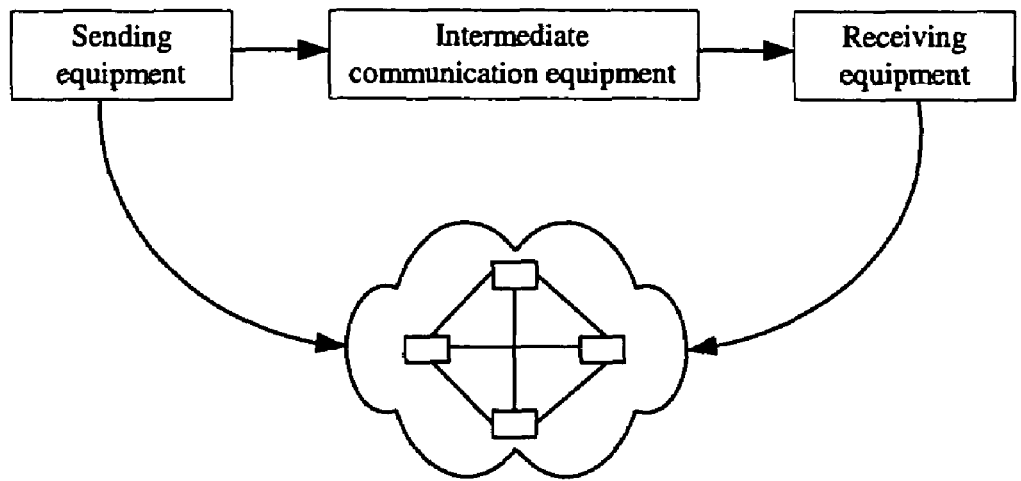
FIG. 1 shows a present data-flow protection diagram based on the network multi-path effect.
Figure 2:
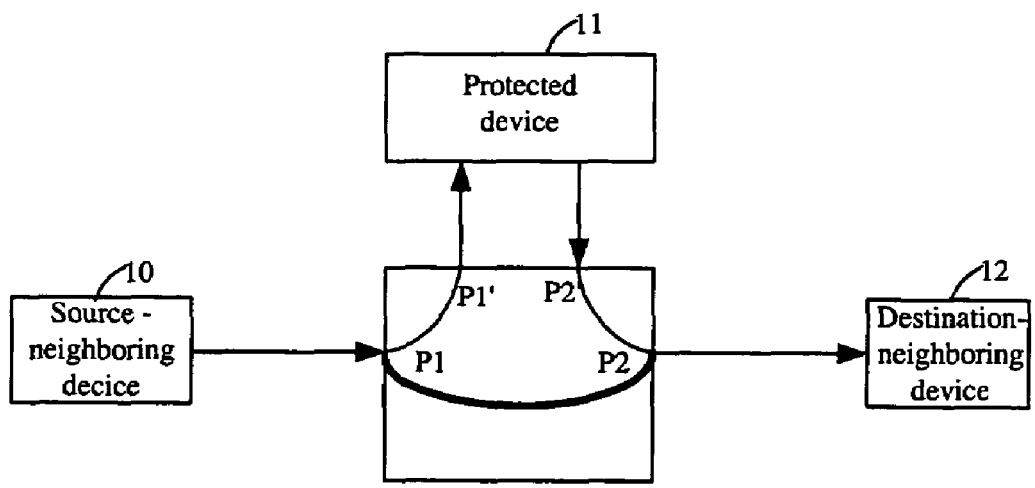
FIG. 2 shows the method logical diagram of the invention.

The logical diagram of the invention is shown in FIG. 2. The protected device 11, such as a router, the source-neighboring device 10 and the destination-neighboring device 12 are interconnected through the device of the invention, wherein P1, P1', P2 and P2' are optical interfaces. When the protected device 11 is normal, P1 and P2 are copied to P1' and P2', respectively. When there are failure or power breakdown in the protected device, P1 and P2 can be connected through the device of the invention and data is transferred transparently.

Figure 3:
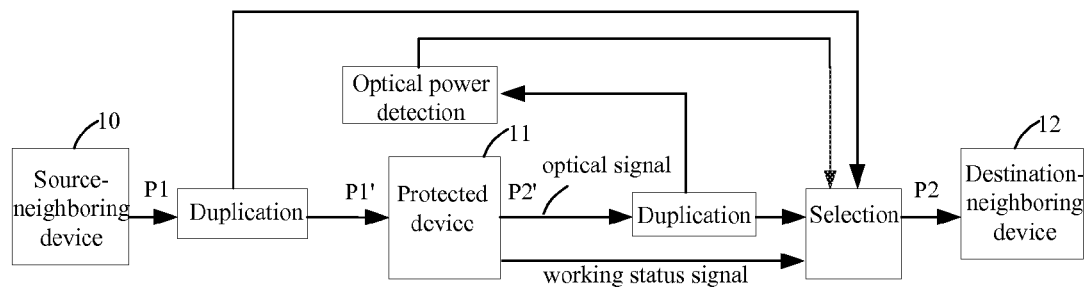
FIG. 3 shows the method detail diagram of the invention.

The detail logical diagram of the invention is shown in FIG. 3. The invention device receives optical-signal from the source-neighboring device 10, and duplicates received optical-signal into two optical-signals. One is sent to selector, another is processed by the protected device 11 and then re-duplicated into two optical-signals. One of the re-duplicated optical-signal is sent to the selector, which selects one of its input signals to send to the destination-neighboring device 12 according to working status of the protected device.

In the method mentioned above, when the protected device 11 is normal, the selector selects the re-duplicated optical-signal (the second time duplication) and sends to the destination-neighboring device. When the protected device 11 is abnormal, the selector selects the duplicated optical-signal (the first time duplication) and sends to the destination-neighboring device.

Another re-duplicated optical-signal (the second time duplication) is used for optical power detection. When the optical-signal power is lower than a preset threshold value, the selector selects the optical-signal of first time duplication, and then sends it to the destination device.

Figure 4:
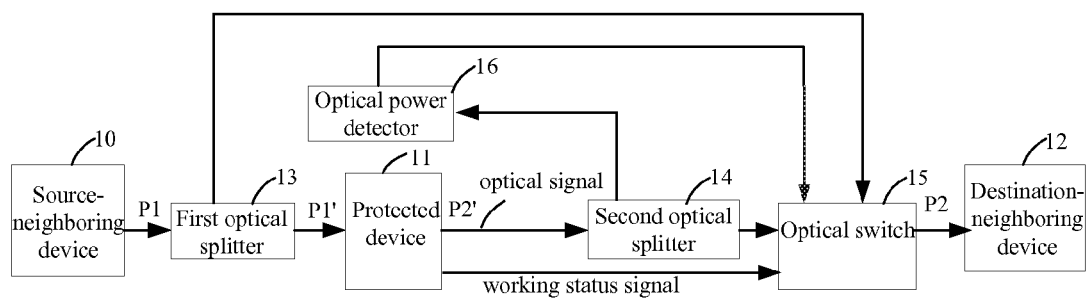
FIG. 4 shows the device diagram of the invention.

The device of the invention for protecting data-flow in the data communication equipment by using optical interface is shown in FIG. 4, there are two optical splitters and one optical switch. The first optical splitter 13 is set between the source-neighboring device 10 and the protected device 11. The second optical splitter 14 and optical switch 15 are sequentially set between the protected device 11 and the destination-neighboring device 12. The first optical splitter 13 is connected with the optical switch 15.

stopThe working procedure of the device of the invention above is as follow. The first optical splitter receives the optical-signal carried data-flow sent by the source-neighboring device, and the received optical-signal is duplicated. One of the duplicated optical-signals is sent to the optical switch 15 directly. Another of the duplicated optical-signals is processed by the protected device 11, and then re-duplicated by the second optical splitter 14. One of the re-duplicated optical-signals is sent to the optical switch 15. According to the protected device working status, the optical switch 15 selects one of the two input optical-signals then sends to the destination-neighboring device. When the protected device is normal, the optical-signals from optical interface P2'of the protected device is selected; and when the protected device is failure, the optical-signals from optical interface P1 is selected, which does not pass the protected device.

The device of the invention above further includes an optical power detection module 16 that connects with the second optical splitter 14. The optical power detection module 16 receives a re-duplicated optical-signal, which is used for optical power detection, from the second optical splitter 14. The voltage output of the optical power detection module 16 is used to control selection of the optical switch 15.

Of course, the optical switch 15 also can be controlled by a logic module 17. If an optical power detected by the optical power detection module 16 is lower than a preset threshold value, the logic module 17 controls the optical switch 15 selecting the duplicated optical-signal from the optical splitter 13 to send to the destination-neighboring device 12, otherwise, if working status of the protected device is not normal, the logic module 17 controls the optical switch 15 selecting the duplicated optical-signal from the optical splitter 13, if working status of the protected device is normal, the logic module 17 controls the optical switch 15 selecting the re-duplicated optical-signal from the optical splitter 14 to send to the destination-neighboring device 12.

Figure 5:
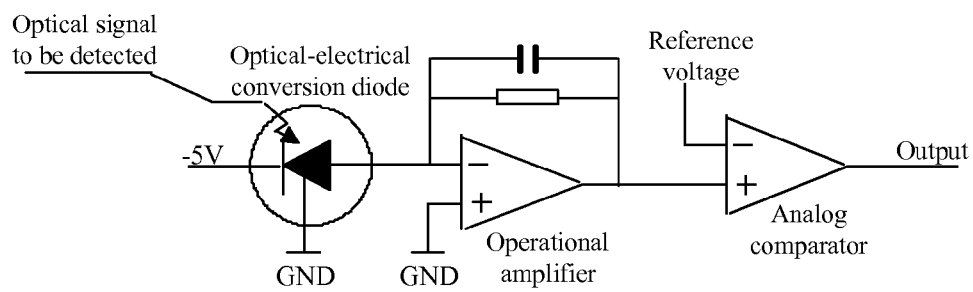
FIG. 5 shows the circuit diagram of the optical power detection module in the invention device.
Figure 6:
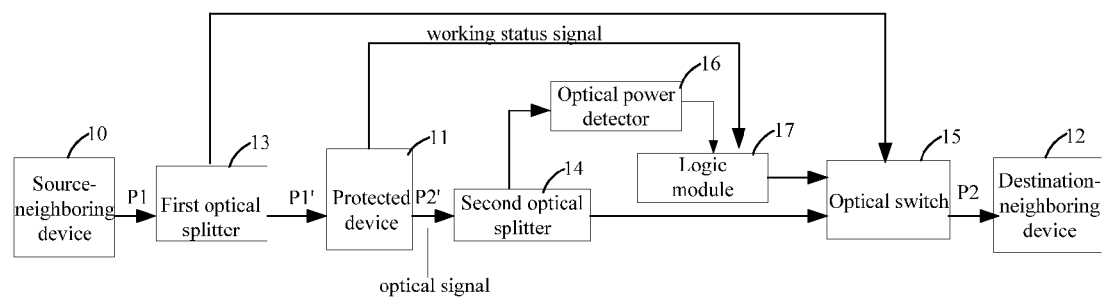
FIG. 6 shows a device diagram of the invention.

A circuit diagram of the optical power detection module above is shown in FIG. 5, which includes an optical-electrical conversion diode, an operational amplifier and an analog comparator. The optical-electrical conversion diode receives a re-duplicated optical-signal from the second optical splitter 14 and converts it to an electrical signal. After amplifying by the operational amplifier, the electrical signal is sent to the analog comparator and compares with a preset voltage signal of power threshold value. The comparison result is used to control the selection of the optical switch 15.

In the device of the invention, the optical switch 15 is a non-latching type. The default status of the optical switch is set so that the source-neighboring device 10 is connected with the destination-neighboring device 12 directly. Once the power of the protected device 11 is breakdown, data-flow between source-neighboring device 10 and destination-neighboring device will be broken only for a short time.

In the invention, for the protected device 11, using optical power detection is to protect the Ethernet interface, which is widely used. For example, when interface of the protected device is an Ethernet interface, since there is no link layer negotiating mechanism, the protected device and its neighboring devices cannot discover the fault of the optical sending module at the Ethernet interface of the protected device. In this case, by detecting optical power of a sending signal, a fault at the Ethernet interface can be discovered. For the Packet Over SDH/SONET (POS) interface, there is a negotiating mechanism at the interface, but the optical power detection is faster than the negotiating mechanism for discovery the fault at the interface.

In the invention, break time of a data-flow is determined by turnover time of the optical switch 15. When a mechanic type of optical switch is used, the turnover time is at millisecond level. When using such as micro electro mechanical system (MEMS) type optical switch, the turnover time will be shorter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for data-flow protection of optical interface, comprising:
    receiving an optical-signal from a source-neighboring device;
    duplicating the optical-signal into at least two duplicated optical-signals: a first duplicated optical-signal and a second duplicated optical-signal,
    sending the first duplicated optical-signal to a protected device for processing, and
    sending directly the second duplicated optical-signal to be selected;
    receiving a working status signal output generated by the protected device and an output optical-signal from the protected device, and selecting one from the second duplicated optical-signal and the output optical-signal of the protected device according to the working status signal output of the protected device, and sending the selected one to a destination-neighboring device.

2. The method according to claim 1, wherein receiving a working status signal output comprises, if the working status signal output of the protected device is normal, selecting the output optical-signal of the protected device and sending the output optical-signal to the destination-neighboring device; if the working status signal output of the protected device is abnormal, selecting the second duplicated optical-signal directly and sending the second duplicated optical-signal to the destination-neighboring device.

3. A data-flow protection device of an optical interface, comprising:
    a first optical-signal duplicating unit and an optical-signal selecting unit;
    wherein an input of the first optical-signal duplicating unit is connected to a source-neighboring device for receiving an optical-signal, a first output of the first optical-signal duplicating unit is directly connected to a first input of the optical-signal selecting unit, a second output of the first optical-signal duplicating unit connects to an input of a protected device;
    wherein a second input of the optical-signal selecting unit is connected to an optical-signal output of the protected device, a control end of the optical-signal selecting unit is connected with a working status signal output of the protected device, an output of the optical-signal selecting unit connects to a destination-neighboring device.

4. The data-flow protection device according to claim 3, wherein the first optical-signal duplication unit is an optical splitter, and the optical-signal selecting unit is an optical switch.

5. A method for data-flow protection of an optical interface comprising:
    receiving an optical-signal from a source-neighboring device;
    duplicating the optical-signal into at least two duplicated optical-signals including a first duplicated optical-signal and a second duplicated optical-signal;
    sending the first duplicated optical-signal to a protected device for processing;
    sending directly the second duplicated optical-signal to be selected;
    receiving a working status signal output of the protected device and an output optical-signal of the protected device from the protected device;
    re-duplicating the output optical-signal of the protected device into at least two re-duplicated optical-signals;
    if the working status signal output of the protected device is normal and if an optical power of one of the at least two re-duplicated optical-signals is not lower than a preset threshold value, selecting the other one of the at least two re-duplicated optical-signals to a destination-neighboring device;
    if the working status signal output of the protected device is normal and the optical power of the one of the at least two re-duplicated optical-signals is lower than the preset threshold value, selecting the second duplicated optical-signal directly and sending the second duplicated optical-signal to the destination-neighboring device;
    if the working status signal output of the protected device is abnormal, selecting the second duplicated optical-signal directly and sending the second duplicated optical-signal to the destination-neighboring device.

6. A data-flow protection device of an optical interface comprising:
    a first optical-signal duplicating unit, an optical-signal selecting unit, a second optical-signal duplicating unit, an optical power detecting module and a logic module;
    wherein an input of the first optical-signal duplicating unit is connected to a source-neighboring device for receiving an optical-signal, a first output of the first optical-signal duplicating unit is directly connected to an input of the optical-signal selecting unit, a second output of the first optical-signal duplicating unit connects to input of a protected device;
    wherein an optical-signal output of the protected device is connected to an input of the second optical-signal duplicating unit, a first output of the second optical-signal duplicating unit connects to the optical-signal selecting unit, a second output of the second optical-signal duplicating unit connects to an input of the optical power detecting module;
    wherein an output of the optical power detecting module is connected to a first input of the logic module, a second input of the logic module is connected to a working status signal output of the protected device, and an output of the logic module connects to a control end of the optical-signal selecting unit, an output of the optical-signal selecting unit connects to a destination-neighboring device.

7. The data-flow protection device according to claim 6, wherein the optical power detecting unit comprises an optical-electrical conversion diode, an operational amplifier and an analog comparator;

wherein the optical-electrical conversion component receives an optical-signal outputted by the second optical-signal duplicating unit, converts the optical-signal to an electrical signal and output the electrical signal to the operational amplifier;

the analog comparator receives the amplified electrical signal from the operational amplifier, compares the amplified electrical signal with a preset threshold value, outputs a control signal to an input of the logic module control.

* * * * *

UNITED STATES PATENT AND TRADEMARK OFFICE
CERTIFICATE OF CORRECTION

PATENT NO. : 7,447,428 B2  Page 1 of 1
APPLICATION NO. : 10/615032
DATED : November 4, 2008
INVENTOR(S) : Chongyang Wang et al.

It is certified that error appears in the above-identified patent and that said Letters Patent is hereby corrected as shown below:

On the Title Page,

Item (75) Inventors: "Shunyou Dong" should be --Shuyou Dong--.

Signed and Sealed this

Eighth Day of September, 2009

David J. Kappos
*Director of the United States Patent and Trademark Office*